Jan. 14, 1947.  S. FRANKEL  2,414,372
MACHINE FOR ASSEMBLING UPHOLSTERY SPRINGS
Filed Oct. 7, 1944  8 Sheets-Sheet 1

Fig.1.

INVENTOR.
Sydney Frankel
BY
Williams, Rich & Morse
ATTORNEYS

Jan. 14, 1947.                S. FRANKEL                2,414,372
            MACHINE FOR ASSEMBLING UPHOLSTERY SPRINGS
                   Filed Oct. 7, 1944        8 Sheets-Sheet 2

Jan. 14, 1947.  S. FRANKEL  2,414,372
MACHINE FOR ASSEMBLING UPHOLSTERY SPRINGS
Filed Oct. 7, 1944  8 Sheets-Sheet 3

INVENTOR.
Sydney Frankel
BY
Williams, Rich & Morse
ATTORNEYS.

Jan. 14, 1947. S. FRANKEL 2,414,372
MACHINE FOR ASSEMBLING UPHOLSTERY SPRINGS
Filed Oct. 7, 1944 8 Sheets-Sheet 5

INVENTOR.
Sydney Frankel
BY
Williams, Rich & Morse
ATTORNEYS

Fig. 18.

Patented Jan. 14, 1947

2,414,372

UNITED STATES PATENT OFFICE 2,414,372

MACHINE FOR ASSEMBLING UPHOLSTERY SPRINGS

Sydney Frankel, New York, N. Y., assignor to Murray J. Rymland, Baltimore, Md.

Application October 7, 1944, Serial No. 557,673

28 Claims. (Cl. 140—3)

This invention relates to machines for fabricating spring assemblies such as those used in mattresses, upholstery and the like. More particularly it relates to a machine for assembling preformed coil spring elements into completed or semi-completed spring assemblies, its specific function being to unite upholstery coil springs to one another by means of helical tie wires.

The object of the invention is to provide an improved machine of the type specified which is simple and efficient in construction and operation, requiring minimum space and power, capable of being operated by unskilled labor and of producing a uniform product. It is a further object to provide such a machine which can be adjusted for operation on upholstery springs of varying sizes.

The invention resides in the novel devices, combinations and arrangements of parts hereinafter described and defined in the claims.

The first parts of the machine to be described will be the spring clamping and positioning jaws which may best be seen in Figs. 3, 10, 11, 12 and 14. These jaws function to clamp segments of the end coils of upholstery springs S in the proper position for encirclement by helical tie-wires which are fed through the jaws to join the end coils together. The other major parts of the machine serve to support these jaws, to open and close them, to direct the springs into them, to transport them away from the jaws after they have been joined and to feed the tie-wires through them, all in properly timed sequence.

Figures 10, 11:
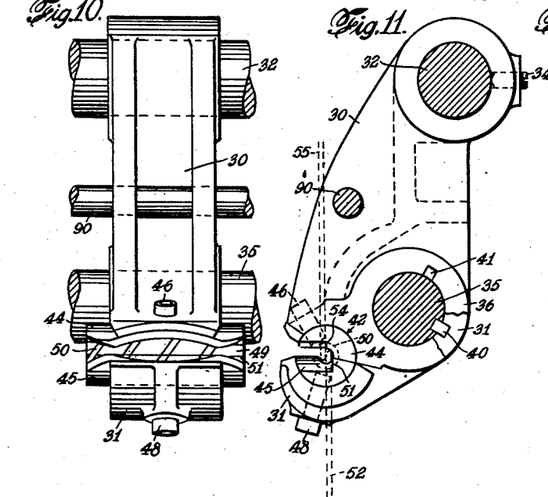
Figs. 10, 11 and 12 are respectively front, side and rear elevations of the spring positioning and clamping jaws together with sections of their supporting and operating shafts.
Figure 12:
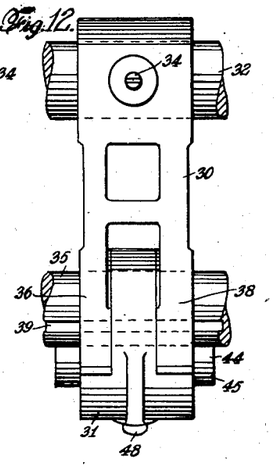

Referring first to Figs. 10, 11 and 12, the jaws are constructed as follows: Each pair of jaws consists of an upper jaw member 30 and a lower jaw member 31. These two parts may be castings, the upper jaw member preferably being drilled to receive an upper supporting shaft 32 along which it can slide and to which it may be fixed in any desired position by set screws 34. In its lower part, it is similarly drilled to freely receive a rotatable shaft 35. The lower part of the upper jaw member 30 is bifurcated to form the two depending legs 36 and 38 (Fig. 12) between which the lower jaw 31 is mounted on the shaft 35. This shaft is provided with a keyway 39 and the lower jaw members 31 are keyed thereto by short keys 40 which are held in place between legs 36 and 38. To permit insertion of these keys, at least one of the legs 36 or 38 is provided with an opening as shown at 41 (Fig. 11) through which the key may be inserted when the keyways in shaft 35 and lower jaw 31 are lined up with it. This slot 41 is in such a position that during the operation of the machine it is beyond the range of rotation of the key 40. It will thus be seen that rotation of the shaft 35 will carry with it the lower jaw 31 moving it toward or away from the upper jaw 30. The shafts 32 and 35 hold the upper jaw in a fixed position.

The castings of the jaw members 30 and 31 are drilled out as shown at 42 (Fig. 11) to receive two spring gripping elements 44 and 45 secured in their respective supporting castings by bolts 46 and 48.

Figure 14:
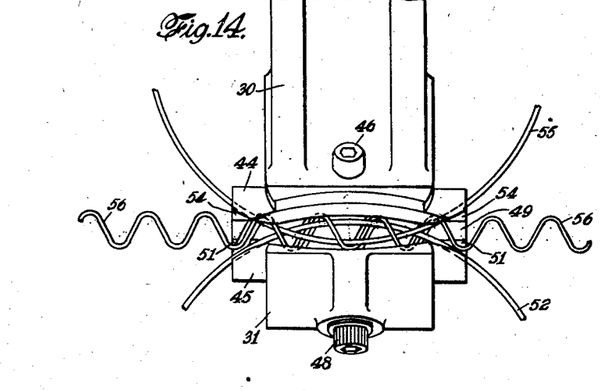
Fig. 14 is a front elevation of part of the jaws showing segments of two spring end coils in position and a section of helical tie-wire surrounding them.

The elements 44 and 45 are given a particular internal configuration to bring about the desired positioning of the coil spring end-coils and the proper encirclement thereof by the helical tie-wire. They have a longitudinal cylindrical passage 49 approximately of the same diameter as the inside diameter of the tie-wire helix. Around this passage the elements are provided with a spiral groove 50 through which the tie-wire passes. Referring to Fig. 14, the elements 44 and 45 are further cut away at their front edges along arcuate lines generally corresponding to the average curvature of the end-coils of the coil springs to be assembled so that the end-coils may be inserted between the jaws when the latter are only slightly open. As may be seen from Figs. 11 and 14, the lower element 45 is cut back somewhat beyond its center line, the cut terminating in a shoulder 51 so as to position an end-coil, such as 52, behind the center of the passage 49 as shown in dotted lines in Fig. 11. The upper element 44 is cut back to provide a shoulder 54, the face of which is about on the center line of the opening 49 so that an end-coil, such as 55, will be positioned on top of and overlapping the end coil 52.

Thus when a pair of end-coils are gripped between the jaws and the jaws are closed tightly, the lowermost coil 52 will be gripped between the top of the passage 49 and the arcuate jaw faces adjacent the shoulders 51; and the upper coil 55 will be similarly gripped between the bottom of the opening 49 and the arcuate faces of the upper element 44 adjacent the shoulders 54. This clamping action on the end-coils will eliminate possible irregularities in their curvature and will position them accurately for encirclement by the helical tie-wire 56 as it passes through the spiral groove 50.

Figure 1:
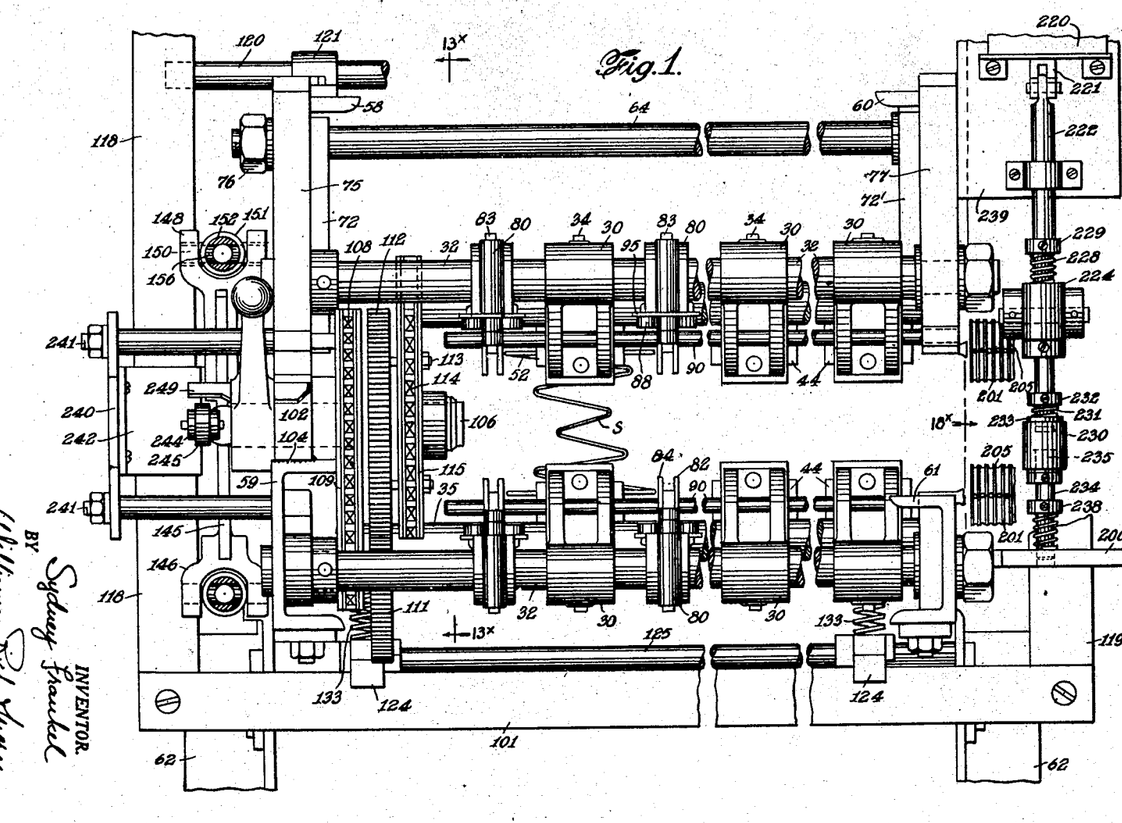
Fig. 1 is a top plan view of the machine longitudinally condensed, some parts being shown in section and certain details being omitted.
Figure 2:
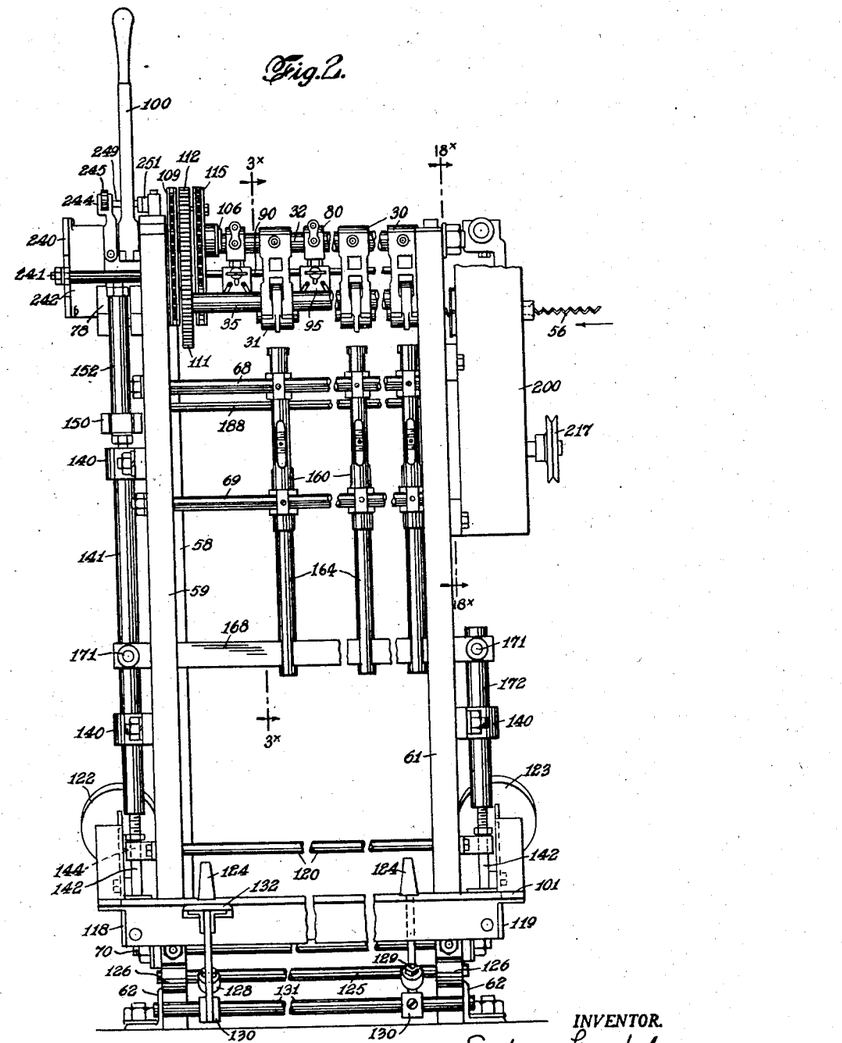
Fig. 2 is a side elevation similar to Fig. 1 as seen from the bottom of Fig. 1.
Figures 4, 5, 6:
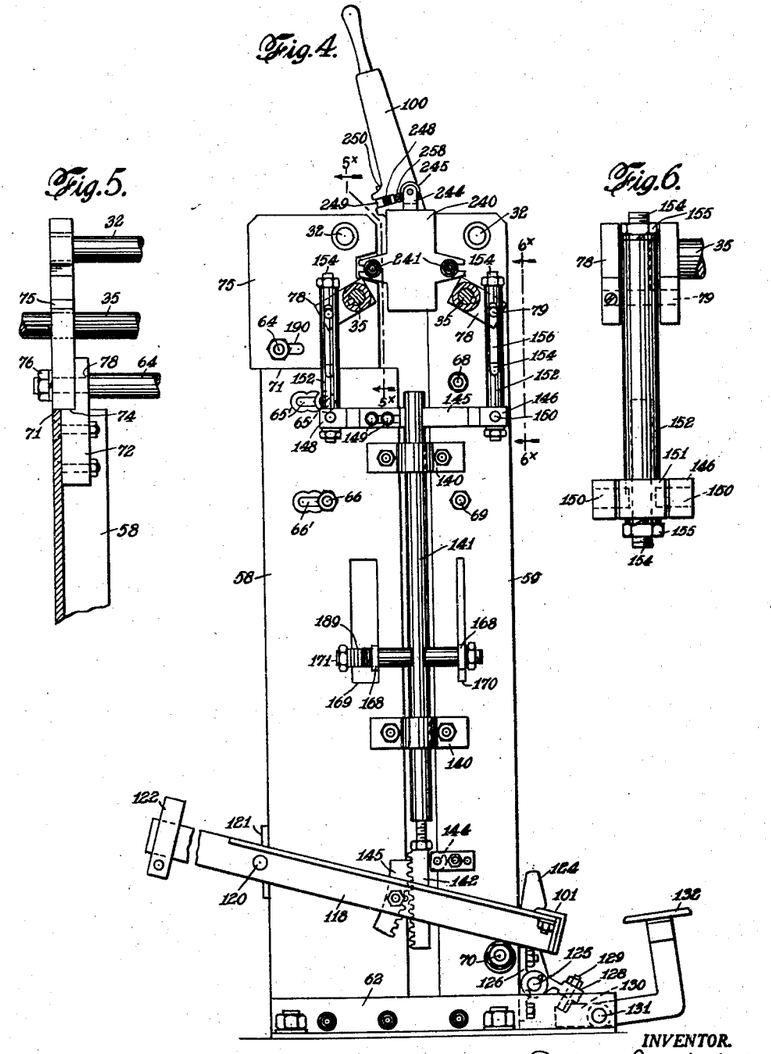
Fig. 4 is an end elevation as seen from the left of Fig. 2.
Fig. 5 is a detail taken on the line $5x$—$5x$ of Fig. 4.
Fig. 6 is another detail of the crank operating link taken on the line $6x$—$6x$ of Fig. 4.

Referring now to Figs. 1, 2 and 4, the jaws just described are supported in the machine as follows: The framework of the machine comprises vertical channel members 58 and 59 at one end of the machine and similar channel members 60 and 61 at the other end of the machine. The channel members on each side are connected at the bottom to angle irons 62 which may be secured to the floor or other support. The channel members 58 and 60 at opposite ends of the machine are joined by suitable horizontal tie-rods such as rods 64, 65, 66 and the channel members 59 and 61 are joined by suitable tie-rods 68, 69 and 70. The tie-rods have threaded, shouldered ends, pass through the channel members and are held by nuts.

As may be seen from Figs. 4 and 5, the channel member 58 is shorter than the channel member 59 and terminates in a flat upper surface 71 adjacent which there is attached to it a recessed block 72. Slidably mounted on the surface 71 and on the shoulder 74 of block 72 is a vertical plate 75. This plate is held in place by the nut 76 which is threaded on the end of shaft 64, the latter having a shoulder 78 which bears against the block 72 so that tightening nut 76 clamps plate 75 in place. At the opposite end of the machine a plate 77 (Figs. 1 and 3) is mounted for sliding movement on the top of channel member 60 in the same manner, a recessed block 72' being secured to the channel member to support it.

As best shown in Figs. 1 and 4, the right-hand pair of jaw-supporting shafts 32 and 35 are secured in suitable bearings mounted in the channel members 59 and 61 and the left-hand pair of shafts 32 and 35 are similarly mounted in the channel 60 and the plate 75. The shafts 32 are fixed but it will be noted that the shafts 35 are so mounted as to permit rotation. They extend outwardly beyond the plate 75 and channel 59, respectively, and to their protruding ends there are keyed short cranks 78 having crank pins 79 (see Fig. 6). As may be seen in Fig 1, the jaws 30 and 31 are spaced along the shafts 32 and 35, alternating with the spring guiding members shown in Figs. 7, 8 and 9 and hereinafter described. The jaws are arranged in the machine so as to be oppositely disposed for clamping the end-coils at opposite ends of a coil spring S. There are two sets of jaws for each coil spring element. For example, if a spring assembly is to be made up of rows each containing 10 coils, there will be 10 sets of jaws on each side of the machine.

As will more fully appear in the description of the operation, the individual coil springs are manually placed in the machine and are pushed downwardly between the opposed sloping faces of the jaw elements 30. To direct the end coils into the jaws, spring guiding members are provided which are adjustable to adapt the machine to springs having different sizes of end-coils. These guides will now be described.

Figure 7:
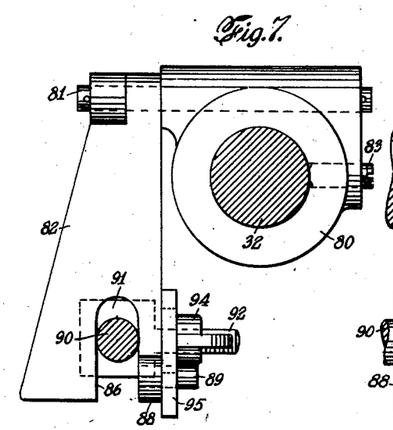
Figs. 7, 8 and 9 are respectively side, front and rear elevations of the adjustable spring directing guides.
Figure 8:
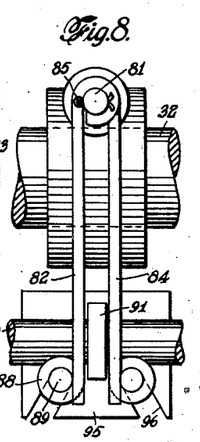
Figure 9:
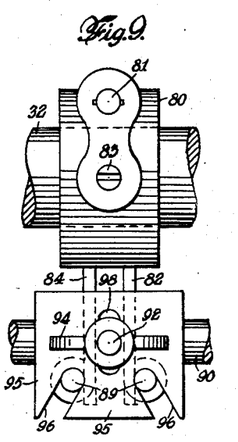

Referring to Figs. 7, 8 and 9, a casting 80 is provided with an opening having a sliding fit on the shaft 32 on which it can be fixed by set-screws 83. At right angles to this opening the casting is drilled longitudinally to receive a pin 81. This pin extends outwardly from the casting 80 and supports a pair of wings 82 and 84 which are rotatable on pin 81 and secured thereon as by a cotter pin 85. The wings are slotted at the bottom, as shown at 86, and their lower rear edges are coiled as shown at 88 to hold short studs 89. Mounted longitudinally in the machine, parallel to the jaw supporting shafts 32 and 35, is a smaller shaft 90 which passes through the slots 86 and through holes drilled in the upper jaw member 30 in which it is supported, as shown in Figs. 10 and 11. Surrounding the shaft 90, between the wings 82 and 84, are blocks 91 provided with threaded studs 92 to receive wing nuts 94. On these studs are secured plates 95 having converging diagonal slots 96 extending upwardly from their lower edges and vertical slots 98 permitting a vertical movement of the plates over the studs 92. The diagonal slots 96 receive the studs 89, and it will be seen that, by vertical movement of the plates 95, the wings 82 and 84 may be forced apart or drawn together and secured in the desired position by tightening the wing nut 94. When springs having the largest size of end-coils are used, the wings 82 and 84 will be close together as shown in Fig. 8. When springs having smaller end coils are used, the wings may be separated by raising the plates 95 so as to center the coils in the jaws.

Referring to Fig. 4, the mechanism for rotating the shafts 35 to open and close the jaws comprises a hand lever 100 at the top of the machine and a foot treadle 101 at the bottom of the machine together with associated mechanism. As will hereinafter appear, the machine is adjusted so that the jaws can be completely closed only by means of the hand lever, the foot treadle, when depressed, closing them only partially.

Figure 13:
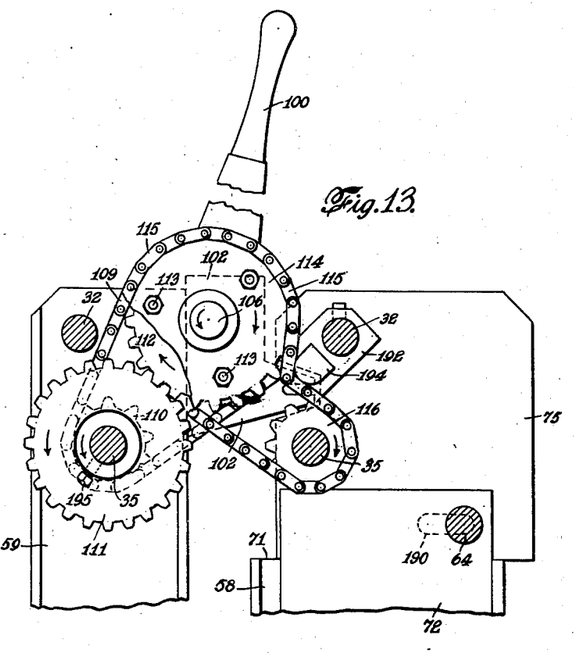
Fig. 13 is a section taken on the line $13x$—$13x$ of Fig. 1, showing the mechanism for connecting the rotating shaft to cause their simultaneous rotation in opposite directions and associated parts.

Referring particularly to Fig. 13, a block 102 is fastened to the side of channel member 59 as by welding 104 (Fig. 1). This block carries a bearing in which there is rotatably mounted a short shaft 106 extending horizontally on either side of the block. The handle 100 is keyed to one end of the shaft and a sprocket 108 (see Fig. 1) is keyed to the shaft on the other side of the block 102. This sprocket drives a chain 109 which in turn drives a sprocket 110 keyed to the shaft 35 on the left side of Fig. 13. Fixed to the same shaft 35 adjacent the sprocket 110 is a gear 111 which meshes with a gear 112 which rotates freely on shaft 106. Secured to this gear as by bolts 113, and also free to rotate on shaft 107, is a sprocket 114 driving a chain 115 which in turn drives a sprocket 116 on the shaft 35 on the right in Fig. 13. With this shaft coupling and driving arrangement movement of the handle 100 will rotate the two shafts 35 at the same speed and simultaneously in opposite directions, the movements of the several parts being shown by arrows.

Referring to Figs. 1 and 4, the foot treadle 101, which extends across the front of the machine, is secured at either end to side bars 118 and 119 which are pivoted at the rear of the machine on a shaft 120 which is mounted in brackets 121 secured to the channel members 58 and 60. The foot treadle is normally urged upwardly by means of counter-weights 122 and 123 secured to extensions of the side bars, or by springs which may be substituted therefor (not shown), and is adapted to be held in its lowermost position by pawls 124 fixed on a shaft 125 which extends across the front of the machine and is secured to the channel members 59 and 61 by brackets 126 (see Fig. 2). Each pawl is provided with a lever arm 128 carrying an adjustable stop 129 which bears against a release lever 130 fixed on shaft 131 which is adapted to be rotated by a release pedal 132. Springs 133 (Fig. 1) urge the pawls 124 toward the treadle.

Referring to Figs. 2 and 4, mounted in brackets 140 attached to channel members 58 and 59 is a reciprocating actuating member 141, the bottom of which is adjustably attached to a rack 142 which is supported by a thrust roller 144 and meshes with a gear segment 145 attached to the side bar 118.

To the top of the actuating member 141 is secured a cross bar 145 which carries at either end the yokes 146 and 148, the latter being adjustably mounted by bolts 149. Referring additionally to Fig. 6, each yoke carries pins 150 which are extended into bearings in the base 151 of a tubular link 152. This link is threaded internally to receive threaded adjusting studs 154, secured by lock nuts 155. Each link is longitudinally slotted at 156 to receive the crank pin 79 of crank 78 attached to a shaft 35.

From the foregoing, it will be seen that when the actuator 141 is reciprocated by treadle 101, the crank pin 79 will be engaged by the lowermost stud 154 at the end of the upward stroke and by the uppermost stud 154 at the end of the downward stroke. As is now apparent, this will open and close the jaws 30 and 31. The length of the stroke of member 141 being fixed as desired by the adjustments provided, the studs 154 serve to adjust the amount by which the jaws may be opened and closed by means of the foot treadle. Assuming that the full depression of treadle 101 does not rotate the cranks 78 sufficiently to fully close the jaws, it will be seen that they can nevertheless be fully closed by hand lever 100 rotating the shafts 35 through the chains 109 and 115, as the crank pins 79 are free to move downward in the slots 156 in the pivoted links 152.

Figures 3, 3A, 3B:
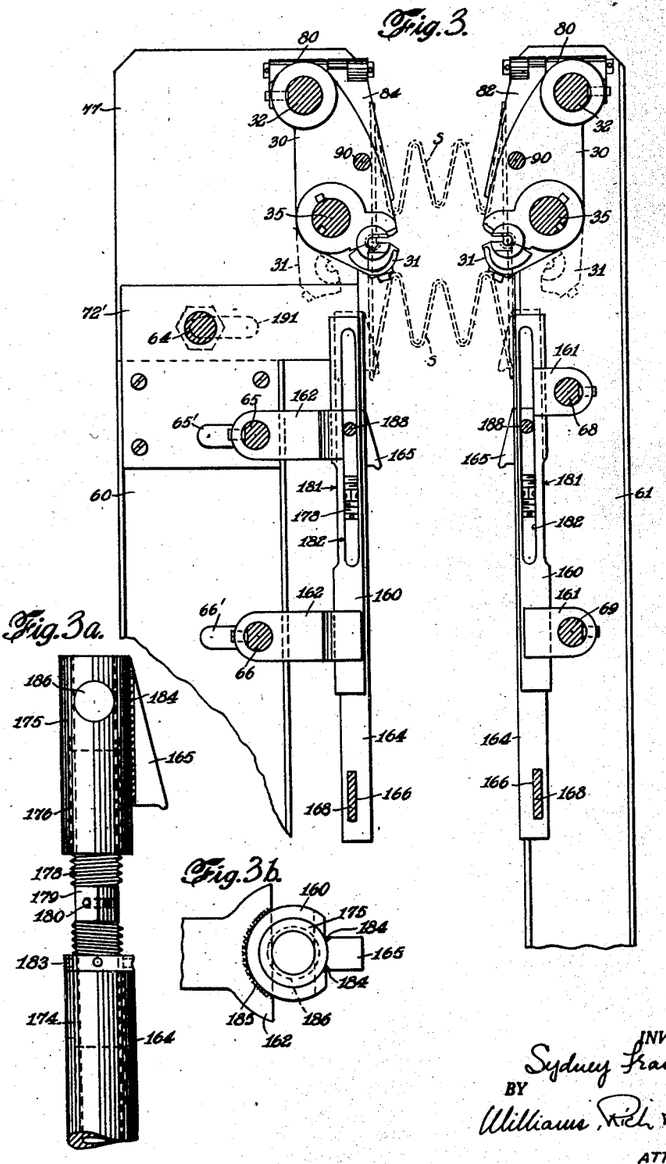
Fig. 3 is a section through the upper part of the machine taken on the line $3x$—$3x$ of Fig. 2.
Figs. 3a and 3b are respectively an elevation and a top view of certain details of the spring advancing mechanism.

The mechanism for moving the coil springs downwardly away from the jaws after they have been joined by helical tie-wires, is likewise operated by the foot treadle 101 and is constructed as follows:

Referring to Figs. 2, 3 and 4, there is mounted underneath each pair of jaws a tubular guide 160 which is supported by brackets 161 or 162 slidably mounted on the pairs of horizontal shafts 65 and 66 or 68 and 69. Sliding in the guides 160 are reciprocating members 164 having hooks 165 at their upper ends adapted to engage the end coils of springs suspended from the jaws (as shown in dotted lines in Fig. 3) upon being elevated. The lower ends of the members 164 are slotted as shown at 166 to receive the cross members 168 which extend through slots 169 and 170 in the channel members 58 and 59 at the left end of the machine and through similar slots in the channel members 60 and 61 at the other end. The bars 168 are connected at their ends to cross bars 171, one of which is fixed to the actuating member 141 and the other of which is connected to a similar but shorter actuating member 172, at the right side of the machine as shown in Fig. 2.

Referring to Figs. 3a and 3b, the position of the hooks 165 on the reciprocating members 164 is preferably made adjustable so that the position of the hooks at their maximum elevation can be changed to take care of springs having end-coils of varying diameter. This may be done, as shown, by making the member 164 from tubing which is internally threaded in its upper portion as shown at 174 and by attaching the hook 165 to a separate short piece of tubing 175 similarly threaded as at 176. These two threads are opposite in pitch and the two sections of tubing are joined by a right and left-hand screw 178 having a squared central portion 179 preferably drilled with cross holes 180 so that it may be rotated by means of a wrench or pin. The guides 160 are slotted as shown at 181 and 182 to give access to the screws 178 for adjustment. A lock nut 183 locks screw 178 in place. The hooks 165 may be secured to the side of the sections of tubing 175 by welds 185 and the brackets, such as 162, may be welded to guides 160 as shown at 185. The hook-carrying tube 175 may be provided, if desired, with a hole 186, at right angle to the plane of the hook, through which a rod 188 may be passed, joining all of the tubes 175 on one side of the machine together. This will aid in keeping the hooks in alinement and will strengthen the structure.

As may be seen from Figs. 3 and 4, as the foot treadle 101 rises, the hooks 165 will be elevated to the dotted line positions of Fig. 3 and into engagement with the end-coils of the springs S depending from the jaws. During the uppermost portion of the stroke, the lower studs 154 of the links 152 will engage the crank pins 79 and rotate the shafts 35 to open the jaws fully to the position shown in dotted lines in Fig. 3. Shafts 35 are rotated about 60 degrees to fully open the jaws. On the downward stroke the hooks 165 will draw the row of springs downwardly. When the upper studs 154 engage the crank pins 79, the jaws will begin to close and at the end of the stroke of the foot treadle they will be just sufficiently open to allow insertion of another set of springs into the jaws, for example the shafts 35 will be within about 5 degrees of the fully closed position. The full-line position of the hook 165 in Fig. 3 is an intermediate position, the full travel of the hooks corresponding to the diameter of the end-coils of the springs being assembled, so as to draw down a spring which has the lower sides of its end-coils in the jaws to a position where the upper sides of its end-coils are in the jaws. It will be drawn down, of course because it is coupled to the spring engaged by the hooks by helical tie-wires.

The machine is arranged so that the horizontal distance between the row of jaws on one side of the machine and the row of jaws on the other side may be adjusted. As may be seen in Figs. 3 and 4, the horizontal tie-rods 65 and 66 are mounted in slots 65' and 66' in the channel members 58 and 60 so that they may be fixed at different distances from the center of the machine, carrying with them the tubular guides 160 which are mounted on them. The slot 169 in channel member 58 is also wide enough to permit shifting of the bar 168, which passes through it, to different positions on the cross bar 171 on which it may be adjusted by means of shims 189 which can be placed on one side or the other of the bar 168. The plates 75 and 77 carrying the shafts 32 and 35 can be shifted along the tops of the channel members on which they rest by reason of the slots 190 and 191 through which the ends of rods 64 pass. The yoke 148 may be adjusted, together with the other parts just mentioned, by loosening the bolts 149 so that the link 152 carried by the yoke may be moved with its associated crank 78. By adjusting these parts it is therefore possible to adjust the space between opposing sets of jaws to accommodate springs of different lengths or to change the tension under which the springs are placed when they are in the jaws.

It will be appreciated that in moving the shaft 35 which is carried by the plates 75 and 77 provision must be made for lengthening and shortening the chain 115 which drives the sprocket 116 attached to that shaft. As shown in Fig. 13, this is accomplished by affixing to the shaft 32 which is carried by plate 75 a block 192 carrying a bearing member 194 having a rounded surface over which the chain slides. When the plate 75 is moved to the right to its full extent chain 115 will be taut and as it is moved to the left the member 194 will press against the chain and take up the slack. The member 194 may be adjustably mounted on the block 192. To synchronize the rotation of the two shafts 35 when the parts of the machine are shifted as above described, so that the jaws on each side of the machine will close simultaneously and completely, gear 111 may be shifted as necessary on its shaft, to which it is secured by a set screw 195.

Figure 18:
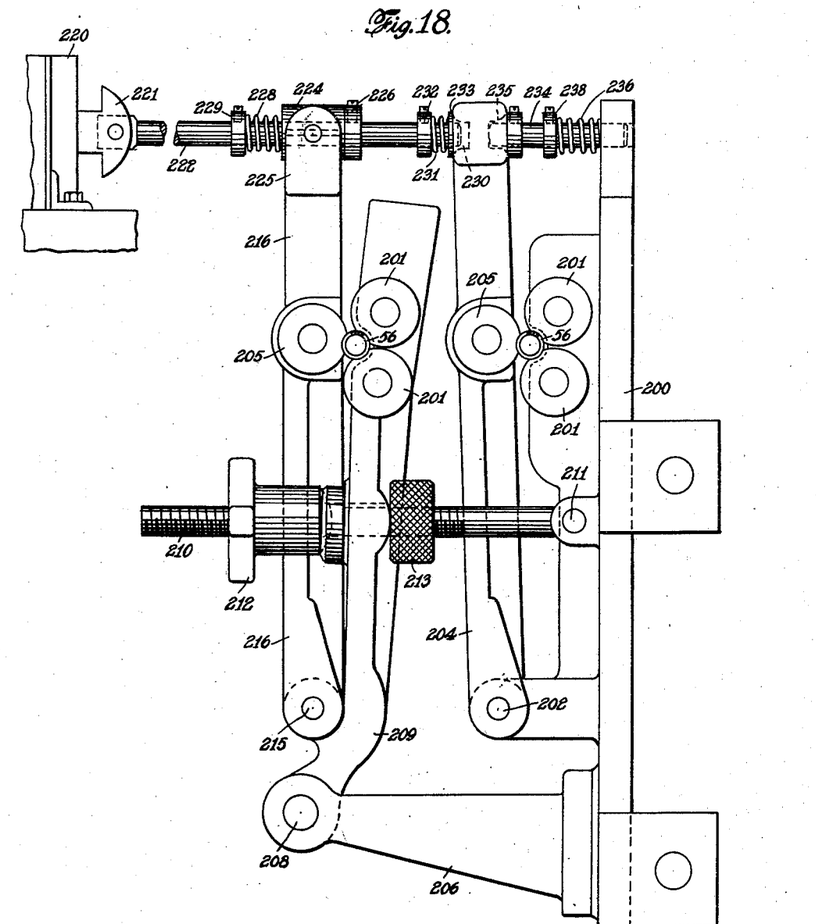
Fig. 18 is an elevation of the principal parts of the tie-wire feeding mechanism taken on the line $18x$—$18x$ of Figs. 1 and 2.

At the right-hand side of the machine as illustrated in Figs. 1 and 2, mechanism is provided for feeding the helical tie wires 56 into the machine and through the jaws to encircle the adjacent segments of the end coils of coil springs S. Referring to Fig. 18, showing the essential parts of this mechanism as it relates to this invention, it comprises a support 200 carrying two fixed driving rollers 201. Pivoted on the support at 202 is an arm 204 carrying a third roller 205 which, upon movement of the arm 204, is moved toward or away from the rollers 201. From the bottom of support 200 there extends a bracket 206 to the end of which is pivoted, at 208, an adjustable arm 209. The distance of this arm from the support 200 is adjusted by means of threaded shaft 210, pivoted to the support at 211, which passes through an opening in the arm 209 and carries the threaded nuts 212 and 213 between which the arm 209 may be secured in any desired position. Pivoted to the arm 209 at 215 is an arm 216. Like the support 200, the arm 209 carries a pair of driving rollers 201 and the arm 216, like the arm 204, carries a third roller 205. The rollers 201 and 205 are all adapted to be rotated simultaneously in the same direction by any suitable means (not shown), driven through a pulley 217 (Fig. 2), so as to rotate and advance the helical tie-wires 56 when they are gripped between the rollers by movement of the rollers 205 toward the fixed rollers 201. This type of tie-wire feeding mechanism, as thus far described, does not per se form part of the present invention and is well known in the art. It will be understood that the rollers are so grooved as to feed the tie-wires axially at a rate corresponding to their pitch. That is, for each revolution they move linearly the distance between the turns of the helix.

It will be apparent from the foregoing that simultaneous movement of the arms 204 and 216 toward the support 200 will bring the rollers 205 into driving engagement with the tie-wires 56, pressing them against the rollers 201, and that movement of the arms 204 and 216 in the opposite direction will disengage this driving mechanism from the tie-wires. Referring to Figs. 1 and 18, these operations are performed by means of a solenoid 220 of the push type whose armature 221 is connected to a shaft 222. This shaft passes freely through a bushing 224 pivotally supported in a yoke 225 at the top of arm 216. The bushing 224 is positioned on shaft 222 between a fixed collar 226 and a spring 228 which bears against a fixed collar 229. Thus the pressure exerted by solenoid 220 is applied to the arm 216 through the spring 228. The shaft 222 terminates in and short of the bottom of a socket 230 at the top of arm 204 adjacent which it is surrounded by a spring 231 held in place between a collar 232 and washer 233 so that movement of the shaft 222 is likewise applied to the arm 204 through a spring. A short shaft 234 extends from a socket 235, opposite the socket 230, through an opening in the top of support 200 and is urged away from the support by a spring 236 held in place by a collar 238. When the solenoid 220 is deenergized, the spring 236 moves the arms 204 and 216 to the position they occupy prior to energization of the solenoid, in which position the rollers 205 are out of driving engagement with the tie-wires 56. The support 200 is fastened to the channel member 61 and the solenoid is mounted on a bracket 239 fastened to channel member 60.

Means, about to be described, are provided for automatically energizing the solenoid 220 at the instant when the jaws 30 and 31 are completely closed by means of the handle 100, so that the tie-wires, which have previously been inserted between the rollers 201 and 205, are fed through the machine. Referring to Figs. 1, 2 and 4, a bracket 240 is mounted on studs 241 which extend outwardly a short distance from the channel member 59 and the block 102 which is affixed to it. On the plate 240 and facing the machine frame members is mounted a switch 242 of standard construction having an actuating arm 244 provided with a roller 245. Movement of the arm 244 closes the contacts in the switch which control the circuit (not shown) which energizes the solenoid 220.

Figures 15, 16:
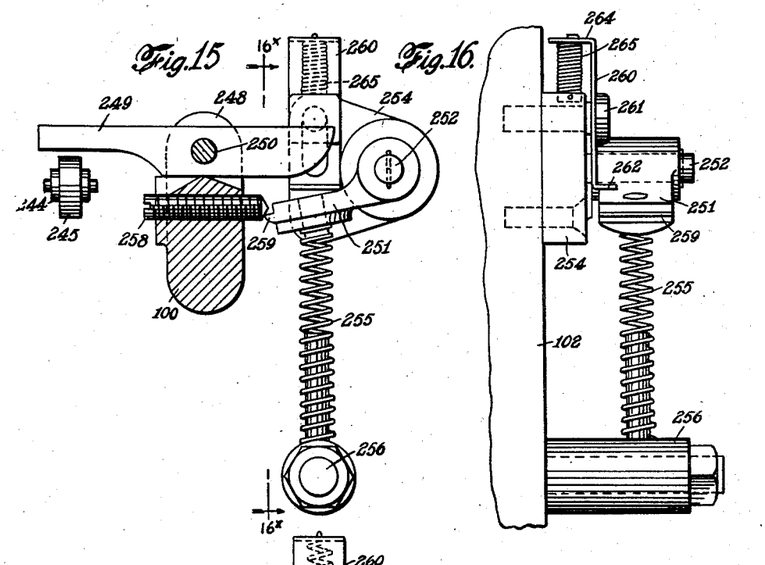
Fig. 15 is a plan view of the switch actuating mechanism associated with the operating handle.
Fig. 16 is a projection of part of the structure shown in Fig. 15 taken on the line $16x$—$16x$ thereof.
Figure 17:
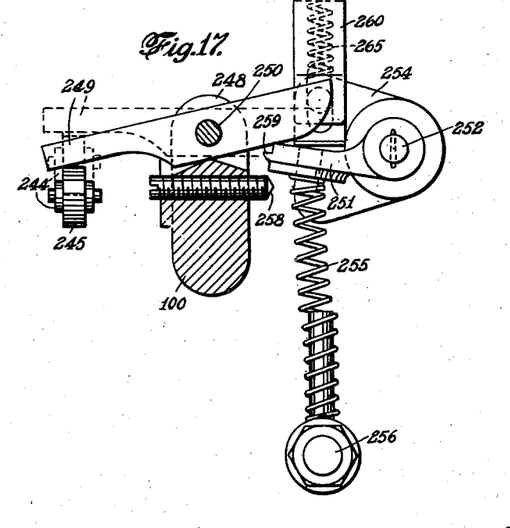
Fig. 17 is a view similar to Fig. 15 showing the parts in a different position.

The apparatus for moving the switch arm 244 to close the switch at the desired instant is shown in detail in Figs. 15, 16 and 17. As may be seen therefrom, and from Fig. 4, the handle 100 is provided above its connection to shaft 106 with a slot 248 in which is mounted a short lever 249 rotating on a pin 250. One end of the lever 249 is adapted to engage the switch arm roller 245 and the other end is in the path of a striker 251, which is mounted on a pivot 252 affixed to a block 254 fastened to an adjacent stationary frame member such as the block 102. The striker is urged toward the lever 249 by a spring 255 secured to a post 256 which is also fastened to a frame member. Parallel to the slot 248 a pointed screw 258 is adjustably mounted in the handle 100 to engage the edge 259 of the striker. The screw 258 is so adjusted that, as the handle 100 is moved into the jaw closing position, it will move the striker 251 to compress the spring 255, as shown in Fig. 15, and will allow the striker to slip past just as the jaws reach the fully closed position, at which point the striker strikes the lever 249, as shown in Fig. 17, moving it suddenly through a sufficient arc to actuate the switch 242, the lever and the switch arm moving from the dotted line to the full line position. To prevent over-travel of the striker 251 and to gradually decelerate it, a slider 260 is mounted on a stud 261 attached to the block 254. One end 262 of the slider is turned up into the path of the striker and the other end 264 is turned down and attached to a coil spring 265, the other end of the spring being fastened to the block 254. Thus, when the striker engages the end 262 of the slider, the spring 265 is extended and counteracts the pressure of spring 255, as shown in Fig. 17, resiliently holding the striker in such a position that the screw 258 can slip by it on its return stroke and will reengage the edge 259 when the handle is again moved to jaw-closing position.

*Summary of operation*

The operator has three machine controls: (1) the handle 100 at the top of the machine, (2) foot treadle 101 extending across the bottom of the machine, and (3) the release pedal 132.

The operator has two material handling operations: (1) the insertion of coil spring elements in the top of the machine between each pair of jaws 30 and 31 and (2) the insertion of pre-cut helical tie-wires between the driving rollers 201 and 205 at the end of the machine.

The series of operations performed by the operator, who stands at the side of the machine having the foot treadle, and their sequence is as follows:

1. When the spring assembling operation is commenced, the handle 100 is away from the operator, the foot treadle is up and the jaws are wide open as shown in dotted lines in Fig. 3. The operator inserts a row of springs S, pushing them down so that the top edges of their end-coils are between the open jaws.

2. The operator steps on the foot treadle 101 which partially closes the jaws, leaving them open just enough so that the end-coils in the next row of springs can snap into position between them.

3. The operator then inserts the second row of coil springs and their end-coils assume the position shown in dotted lines in Fig. 11, overlapping the end coils of the first row of springs inserted.

4. He then introduces the ends of two pre-cut helical tie-wires between the driving rollers 201 and 205.

5. He pulls the hand lever 100 toward him, which closes the jaws fully and operates the switch 242, energizing the solenoid circuit which moves the driving rollers 205 into engagement with the tie-wires which are rotated and advanced through the jaws into encircling engagement with the spring segments which are clamped therein.

6. The helical tie-wires automatically stop moving when they have passed out of the rollers 201 and 205 and the operator then steps on the pedal 132 which allows the foot treadle to rise, opening the jaws and raising the hooks 165 into engagement with the first row of springs, as shown in dotted lines in Fig. 3. The switch 242 is simultaneously opened, deenergizing solenoid 220.

7. The operator then pushes the foot treadle down, which advances the row of springs a distance corresponding to the diameter of the end coils. Since the springs which have the lower portions of their end coils in the jaws are now tied to the first row, they are pulled down to the point where the upper portions of their end coils are in the jaws. He then inserts another row of springs, another pair of tie-wires, pulls the hand lever toward him and continues to repeat this cycle of operations until the desired number of rows of coils have been joined together.

It is to be understood that the invention is not limited to the details of the present preferred embodiment which has been herein described by way of illustration since numerous details may be changed without departing from the invention as defined in the appended claims.

What is claimed is:

1. A spring assembling machine for joining coil springs together by helical tie-wires comprising two sets of oppositely disposed pairs of jaws for positioning said coil springs in alinement, said pairs each consisting of a fixed jaw and a movable jaw, a pair of rotatable shafts for operating the movable jaws, means connecting said shafts for simultaneous rotation in opposite directions, a lever for actuating said means, driving mechanism for advancing said tie-wires through said jaws, a solenoid for actuating said mechanism, and switching means actuated by movement of said lever to jaw-closing position to energize said solenoid.

2. In a spring assembling machine, means for positioning the end coil of an upholstery coil spring for encirclement by a helical tie-wire comprising a fixed jaw, a rotatable shaft, a movable jaw fixed on said shaft and adapted to close against said fixed jaw, means for rotating said shaft to open and close said jaws, said jaws being internally provided with a groove to receive said tie-wire and so shaped as to position a portion of said coil inside said groove when the jaws are closed.

3. In a spring assembling machine, means for positioning the end coils of two adjacent coil springs in a predetermined relationship for encirclement by a helical tie-wire comprising a fixed jaw, a rotatable shaft, a movable jaw fixed on said shaft and adapted to close against said fixed jaw, means for rotating said shaft to open and close the jaws, said jaws having an internal configuration adapted to position said end coils in said relationship and a groove adapted to receive and direct said tie-wire around the adjacent portions of said coils.

4. In a machine for assembling upholstery springs having substantially parallel end coils, in combination, downwardly extending oppositely disposed fixed jaw members having downwardly converging faces and jaws on their under sides, clamping jaws adapted to swing inwardly and upwardly toward the fixed jaws, rotatable shafts for supporting and moving said clamping jaws, means for rotating said shafts, said jaws having passages therethrough to permit the passage of helical tie-wires in encircling relation to end coils positioned in the jaws, and means for advancing said tie-wires through said passages.

5. A structure as defined in claim 4, wherein said fixed jaw members are so spaced as to compress said springs as they move downwardly over the converging faces whereby the expansion of the springs will force said end coils outwardly into said jaws.

6. A structure as defined in claim 4, wherein said passages through the jaws are helical grooves corresponding in pitch to the helical tie-wire.

7. A structure as defined in claim 4, wherein said rotatable shafts pass through said fixed jaw members and form part of the support therefor.

8. A structure as defined in claim 4, wherein said clamping jaws in opening are adapted to swing outwardly beyond the planes defined by end coils positioned in the fixed jaw members to permit the downward withdrawal of said springs.

9. A structure as defined in claim 4, wherein the entering edges of the jaws are cut away along arcuate lines so as to permit the entry of segments of either the upper or lower portions of end coils when the jaws are only slightly opened.

10. In a spring assembling machine, means for positioning the end coils of two adjacent coil springs in an overlapping relationship for encirclement by a helical tie-wire comprising a fixed jaw, means for holding said jaw in position including a rotatable shaft, a movable jaw fixed to said shaft and adapted to close against said fixed jaw when said shaft is rotated in one direction and to swing out from under said fixed jaw when said shaft is rotated in the other direction, said jaws being formed so as to position adjacent segments of end coils in overlapping relationship when closed and having a helical groove to direct said tie-wire around said overlapping segments.

11. Apparatus for connecting coil springs by means of helical tie-wires comprising a supporting frame, two parallel fixed shafts mounted therein, fixed jaws spaced along said shafts, two parallel rotatable shafts supported at a distance from and parallel to said fixed shafts, clamping jaws mounted on the rotatable shafts and adapted to be swung toward and against the fixed jaws by rotation of said rotatable shafts in one direction and away from the fixed jaws by rotation in the opposite direction, cranks on said rotatable shafts, an actuating member mounted for reciprocation substantially at right angles to said rotatable shafts and having links operatively connected with said cranks whereby reciprocation of said member will rotate said rotatable shafts, and means for moving said actuating member.

12. Apparatus as described in claim 11, wherein said links are provided with elongated slots permitting some reciprocation of said member without moving the rotatable shafts.

13. Apparatus as described in claim 11, wherein said rotatable shafts pass through bearings in said fixed jaws and serve to prevent rotation thereof about said fixed shafts.

14. Apparatus as described in claim 11, wherein said means for moving said actuating member comprises a rack attached thereto, a pivoted lever, and a gear segment carried thereby meshing with said rack.

15. Apparatus as described in claim 11, wherein said means for moving said actuating member comprises a pivoted treadle, a gear segment carried thereby, and a rack attached to said member, the maximum movement imparted to said clamping jaws by means of said treadle in a direction to close the jaws being so limited as to leave the jaws separated sufficiently to permit the entry of segments of said coil springs.

16. In a machine of the type described, for uniting coil spring end coil segments by means of helical tie-wires, in combination, oppositely disposed pairs of spring positioning jaws, parallel rotatable shafts for opening and closing said jaws to successively secure rows of coil springs supplied thereto, reciprocating feeding means for advancing said rows of springs disposed substantially at right angles to said shafts, means for actuating said shafts and said feeding means in properly timed sequence comprising a reciprocating actuating member connected to said feeding means for moving it into engagement with said springs, cranks fixed on said shafts, links connecting said actuating member with said cranks and adapted to rotate said shafts to open said jaws as said engagement is effected (upon movement of the feeding means in one direction) and to close said jaws (on movement in the opposite direction) after the said segments joined by helical tie-wires have been carried beyond the paths through which the jaws move in closing.

17. Apparatus for positioning and clamping the end coils of body springs for encirclement by helical tie-wires comprising parallel shafts supporting oppositely disposed sets of fixed and movable jaws, those shafts supporting the movable jaws being rotatable and fastened to the movable jaws, two operating means for effecting rotation of the rotatable shafts to close the sets of jaws, one of said means being effective to close the jaws only partially and the other of said means being effective to close them completely.

18. Apparatus as described in claim 17, wherein the said means for partially closing said jaws comprises a foot treadle, a reciprocating member operated thereby, and cranks secured to the rotatable shafts actuated by reciprocation of said member.

19. Apparatus as described in claim 17, wherein the said means for completely closing said jaws comprises members interconnecting said rotatable shafts whereby they rotate together in opposite directions, a hand-lever for actuating said members, and lost motion linkage incorporated in said means for partially moving the jaws to permit complete closure thereof.

20. In a spring assembling machine, in combination, a frame, horizontal shafts mounted therein, spring-clamping jaws supported on said shafts including fixed and movable jaws, the said shafts which support the movable jaws being rotatable and having cranks whereby they may be rotated, a first actuating member slidably mounted on said frame substantially at right angles to said shafts, links operatively connecting said member with said cranks and having slots wherein said cranks may move relative to said member, means operatively connecting said rotatable shafts together to cause simultaneous rotation thereof, and a second actuating member for rotating said rotatable shafts whereby they can be rotated beyond the position into which they are moved by said first actuating member.

21. In apparatus of the type described, in combination, a shaft, spring clamping jaw elements mounted thereon in spaced relation, means for positioning the end coils of coil springs in said jaws comprising supports mounted on said shaft between said jaw elements, spring guiding members pivotally mounted on said supports and adapted to engage the peripheries of said end coils, and means for adjusting the position of said guiding members whereby the end coils may be centered in said jaw elements.

22. In apparatus of the type described wherein the end coils of coil springs are positioned for joining in spring-clamping jaws, means for guiding said end coils into said jaws comprising a support, a pair of spring-directing members pivotally mounted on said support, studs carried by said members, a plate movable longitudinally of said members and having diverging slots adapted to receive and position said studs, and securing means to hold said plate in position.

23. In apparatus of the type described wherein the end coils of coil springs are positioned for joining in spring-clamping jaws, means for guiding said end coils into said jaws comprising a support, a pair of spring-directing members pivotally mounted on said support, studs carried by said members, a plate movable longitudinally of said members and having diverging slots adapted to receive and position said studs, said members being slotted adjacent said studs, a rod extending through said slots, threaded elements mounted on said rod and extending through said plate, and a nut thereon adapted to draw said plate against said members.

24. In a machine of the character described, spring positioning means comprising, a fixed upper jaw having a downwardly sloping face and a bifurcated lower portion and at least two shaft-receiving apertures, one of said apertures passing through said lower portion, a swinging jaw rotatably positioned in said lower portion and having a shaft receiving aperture, and a shaft passing through both jaws freely rotatable in said fixed jaw and fixed to said swinging jaw, said jaws having an internal configuration adapted to position the springs as desired and to permit the passage of a helical tie-wire thereabout.

25. In a machine of the type described, spring clamping and positioning means comprising, a fixed upper jaw having a bifurcated lower portion through which is a shaft-receiving passage, means for supporting said jaw, a swinging jaw rotatably positioned between the legs of said bifurcated portion and having a shaft receiving aperture, and a shaft rotatably mounted in said passage passing through said aperture and fixed to said swinging jaw, said jaws being adapted when closed to position a spring and guide a helical tie-wire about a segment thereof.

26. In a machine for assembling upholstery coil springs by means of helical tie-wires, in combination, means for positioning coil springs in alinement, driving means for advancing and rotating helical tie-wires comprising fixed driving rollers and movable driving rollers, pivoted supports for said movable rollers, a solenoid having an armature, means connecting the armature with said pivoted supports to move the same, and switching means for energizing said solenoid.

27. In a machine of the type described, wherein two series of spring positioning jaws are mounted respectively on parallel shafts in opposed relationship to grip opposite end coils of coil springs, means for adjusting the distance between one series of jaws and the other series comprising fixed frame members supporting the shafts on which one series of jaws is mounted, slidable frame members supporting the shafts on which the other series of jaws is mounted, and means for locking the slidable members in position.

28. In a machine of the type described having a pair of rotatable shafts, spring positioning jaws operated by said shafts and comprising jaws adapted to be opened and closed, a handle, means operatively connecting said handle with said shafts to rotate them on movement of the handle, switch tripping mechanism operative upon movement of said lever into a position to fully close said jaws comprising a lever pivoted on said handle, a pivoted striker, a spring urging said striker toward said lever, and a member carried by said handle and adapted to engage said striker to move it to compress its spring and to release it as the handle reaches its jaw closing position.

SYDNEY FRANKEL.